(12) United States Patent
McCarty

(10) Patent No.: US 8,579,249 B2
(45) Date of Patent: Nov. 12, 2013

(54) BIASING DEVICE FOR USE WITH ACTUATORS OF FLUID VALVES

(75) Inventor: Michael Wildie McCarty, Marshalltown, IA (US)

(73) Assignee: Fisher Controls International LLC, Marshalltown, IA (US)

( * ) Notice: Subject to any disclaimer, the term of this patent is extended or adjusted under 35 U.S.C. 154(b) by 360 days.

(21) Appl. No.: 12/939,545

(22) Filed: Nov. 4, 2010

(65) Prior Publication Data

US 2012/0112112 A1 May 10, 2012

(51) Int. Cl.
  *F16K 31/00* (2006.01)
(52) U.S. Cl.
  USPC ............................ 251/63.4; 251/337; 267/169
(58) Field of Classification Search
  USPC .......................... 251/63.4, 337, 63.6; 267/169
  See application file for complete search history.

(56) References Cited

U.S. PATENT DOCUMENTS

| | | | | |
|---|---|---|---|---|
| 1,943,492 A | * | 1/1934 | Symington | 267/4 |
| 3,244,399 A | * | 4/1966 | Jones et al. | 251/327 |
| 3,290,003 A | * | 12/1966 | Kessler | 251/318 |
| 4,201,238 A | * | 5/1980 | Baugh | 137/68.19 |
| 4,271,857 A | * | 6/1981 | Rowe | 137/73 |
| 4,282,979 A | * | 8/1981 | Friedrichs | 213/29 |
| 4,585,024 A | * | 4/1986 | Esseniyi | 137/269 |
| 4,605,035 A | * | 8/1986 | Rasmussen et al. | 137/240 |
| 4,615,507 A | * | 10/1986 | Rousset et al. | 251/337 |
| 4,617,955 A | * | 10/1986 | Melgaard | 137/240 |
| 4,757,834 A | * | 7/1988 | Mieth | 137/15.06 |
| 4,905,574 A | * | 3/1990 | Trevisan | 92/69 R |
| 4,967,785 A | | 11/1990 | Young | |
| 5,170,693 A | * | 12/1992 | Stary | 92/5 R |
| 5,904,173 A | * | 5/1999 | Ozawa | 137/240 |
| 6,041,804 A | | 3/2000 | Chatufale | |
| 6,178,986 B1 | * | 1/2001 | Burmester | 137/240 |

FOREIGN PATENT DOCUMENTS

| | | |
|---|---|---|
| GB | 2 106 985 A | 4/1983 |
| WO | WO-2010/063514 A1 | 6/2010 |

OTHER PUBLICATIONS

Search Report for PCT/US2011/056559, dated Jan. 17, 2012.
Written Opinion for PCT/US2011/056559, dated Jan. 17, 2012.

\* cited by examiner

*Primary Examiner* — John K Fristoe, Jr.
*Assistant Examiner* — Andrew J Rost
(74) *Attorney, Agent, or Firm* — Marshall, Gerstein & Borun LLP

(57) ABSTRACT

A biasing device for use with a piston actuator of a fluid valve includes a tubular seat member, a tubular retention member, a tubular seat bracket, and a biasing element disposed between an external annular flange of the tubular seat member and an external annular flange of the tubular seat bracket. The tubular retention member is partially disposed within the tubular seat member, the tubular retention member passing through an opening in the inner flange of the tubular seat member. The tubular retention member is partially disposed within the tubular seat bracket, the tubular retention member passing through an opening in the inner flange of the tubular seat bracket. The basing member is seated against the exterior annular flange of the tubular seat member and against the exterior annular flange of the tubular seat bracket.

12 Claims, 11 Drawing Sheets

BIASING DEVICE FOR USE WITH ACTUATORS OF FLUID VALVES

FIELD OF THE DISCLOSURE

This patent relates generally to biasing devices and, more specifically, to biasing devices for use with actuators of fluid control valves.

BACKGROUND

Fluid control valves (e.g., linear valves, rotary valves, etc.) are commonly used in process control systems to control the flow of process fluids. A control valve typically includes an actuator (e.g., a pneumatic actuator, hydraulic actuator, etc.) to automate operation of the control valve. To provide these actuators with biasing functionality, a spring is commonly positioned in the actuator to bias a piston of the control valve and/or to return a fluid control member of the control valve to a fail safe position (e.g., an open position, a closed position) during, for example, a system failure. Although the spring provides the actuator with biasing functionality, assembling and/or disassembling the actuator may be somewhat difficult because of the force exerted by the spring on different components of the actuator.

FIG. 1 depicts a known actuator 100 coupled to a body 102 of a valve 104 (e.g., a globe valve, a sliding stem valve) via a plurality of fasteners 106. The actuator 100 includes a cylinder 108 coupled between a first plate 110 and a second plate 112 via a plurality of tie rods 114 and fasteners 116. The cylinder 108 defines a chamber 118 in which a piston 120, a spring 122, and a portion of an actuator stem 124 are positioned. In piston actuators, the spring 122 provides the actuator 100 with fail-safe biasing functionality to move a fluid control element (e.g., a plug) (not shown) of the valve 104 via the piston 120 to a fail-safe position (e.g., an open position or a closed position) during, for example, a system failure. The actuator stem 124 is positioned through an aperture 126 defined by the second plate 112 and an aperture 128 defined by a yoke 130 of the actuator 100.

In practice, the actuator 100 may be coupled to the valve 104 to control the flow of fluid through the valve 104. In particular, the actuator 100 may be used to control the position of the fluid control element operatively coupled to the actuator stem 124 within the valve 104. In operation, to move the fluid control element within the valve 104, a pressure difference is provided across a first chamber portion 132 and a second chamber portion 134. For example, to move the fluid control element vertically down in the valve body 102 (e.g., towards an orifice or valve seat in the valve body 102), the piston 120 may be moved toward the second plate 112 by pumping fluid (e.g., air, process fluid, hydraulic fluid, etc.) through, for example, a port 148 to increase the pressure in the first chamber portion 132. As the pressure in the first chamber portion 132 increases, the force exerted against a first surface 136 of the piston 120 also increases until a force exerted against a second surface 138 of the piston 120 via the spring 122 is overcome by the force exerted against the first surface 136 via the pressure in the first chamber portion 132. As a result, the piston 120 and the actuator stem 124 (which are coupled together) move toward the second plate 112 to move the fluid control element within the valve 104.

Alternatively, to move the fluid control element vertically up in the valve 104, the piston 120 may be moved toward the first plate 110 by exhausting fluid through the port 148 to decrease the pressure in the first chamber portion 132 such that the force exerted on the second surface 138 via the spring 122 overcomes the force exerted on the first surface 136 via the pressure. As a result, the piston 120 and the actuator stem 124 move toward the first plate 110 to move the fluid control element within the valve 104.

To assemble the actuator 100, the spring 122 is positioned in the chamber 118 adjacent the second plate 112 and the piston 120 and the actuator stem 124 are then guided through the spring 122 and the apertures 126 and 128. However, because the spring 122 is typically fully decompressed when the spring 122 is positioned in the chamber 118, coupling the first plate 110 to the actuator 100 may be difficult. In some examples, to enable the first plate 110 to be coupled to the actuator 100, the tie rods 114 must be long to enable apertures 140 of the first plate 110 to be aligned with the tie rods 114 when the spring 122 is decompressed and/or partially extending from the cylinder 108 along with the piston 120. As the fasteners 116 are tightened on the tie rods 114, the first plate 110 moves toward the cylinder 108 and compresses the spring 122 until, for example, the first plate 110 engages an end 142 of the cylinder 108. The fasteners 116 must be tightened uniformly during assembly to prevent the first plate 110 from becoming angled with respect to the top of the cylinder 108, which could cause the spring 122 to shift and/or bind in the cylinder 108. During disassembly of the actuator 100, the fasteners 116 are loosened from the tie rods 114, which decompresses the spring 122 before the first plate 110 can be removed from the actuator 100.

SUMMARY

A biasing device for use with a piston actuator of a fluid valve includes a tubular seat member having an exterior annular flange at a first end of a hollow tube and an interior flange at a second end of the hollow tube, a tubular retention member having a plate at a first end of the tubular retention member, the plate extending laterally beyond external edges of the tubular retention member forming an external flange about a perimeter of the first end of the tubular retention member, a tubular seat bracket having a hollow center portion, an external annular flange at a first end of the hollow center portion, and an internal flange at a second end of the hollow center portion, and a biasing element disposed between the external annular flange of the tubular seat member and the external annular flange of the tubular seat bracket. The tubular retention member is partially disposed within the tubular seat member, the tubular retention member passing through an opening in the inner flange of the tubular seat member. The tubular retention member is partially disposed within the tubular seat bracket, the tubular retention member passing through an opening in the inner flange of the tubular seat bracket. The basing member is seated against the exterior annular flange of the tubular seat member and against the exterior annular flange of the tubular seat bracket.

DETAILED DESCRIPTION

Certain examples are shown in the above-identified figures and described in detail below. In describing these examples, like or identical reference numbers are used to identify the same or similar elements. The figures are not necessarily to scale and certain features and certain views of the figures may be shown exaggerated in scale or in schematic for clarity and/or conciseness. Additionally, several examples have been described throughout this specification. Any features from any example may be included with, a replacement for, or otherwise combined with other features from other examples.

In some examples, the biasing device includes a preloaded spring positioned between ends of opposing seat members that are telescopically coupled together with a retention member. The seat members and retention member may include opposing flanges that engage and/or interlock to limit an amount of movement of the seat and retention members relative to each other. Additionally, the biasing device may be provided with one or more travel stops to limit the amount of movement of the seat or retention members toward each other. While the example biasing device described herein is depicted being utilized with actuators, the example biasing device may be used in any other suitable application.

Figure 1:
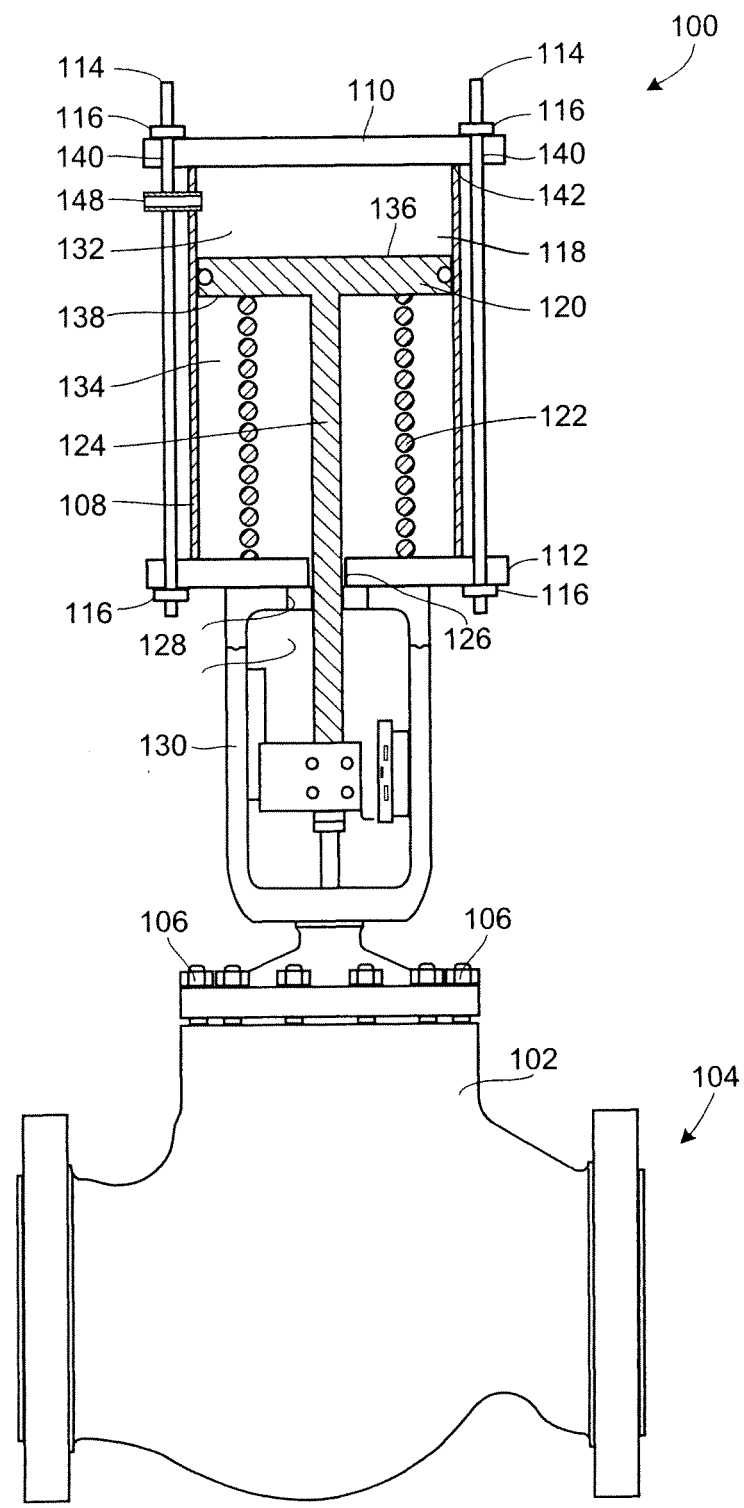
FIG. 1 depicts a known actuator and valve.
Figure 2:
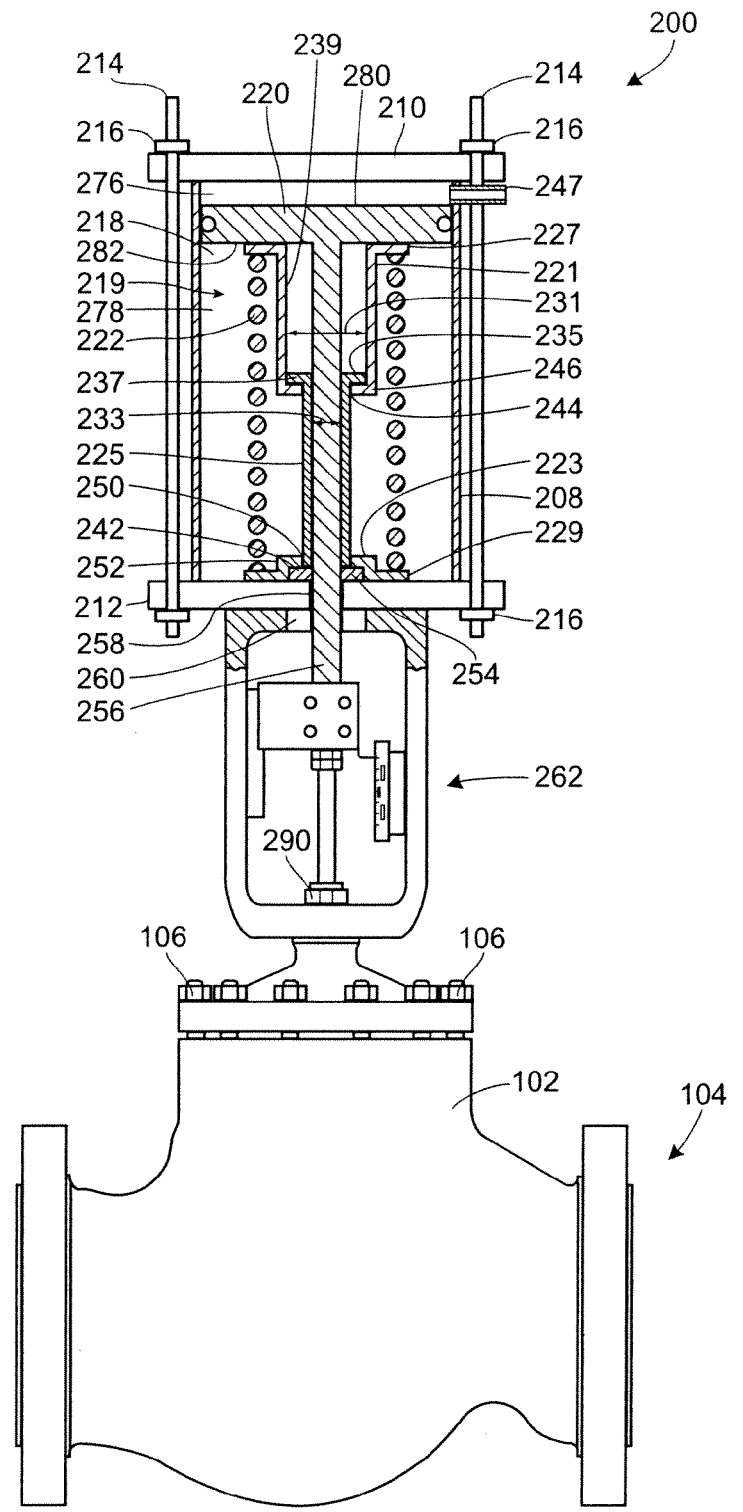
FIG. 2 depicts a valve and an actuator that includes one embodiment of a biasing device constructed in accordance with the teachings of the disclosure.
Figure 3:
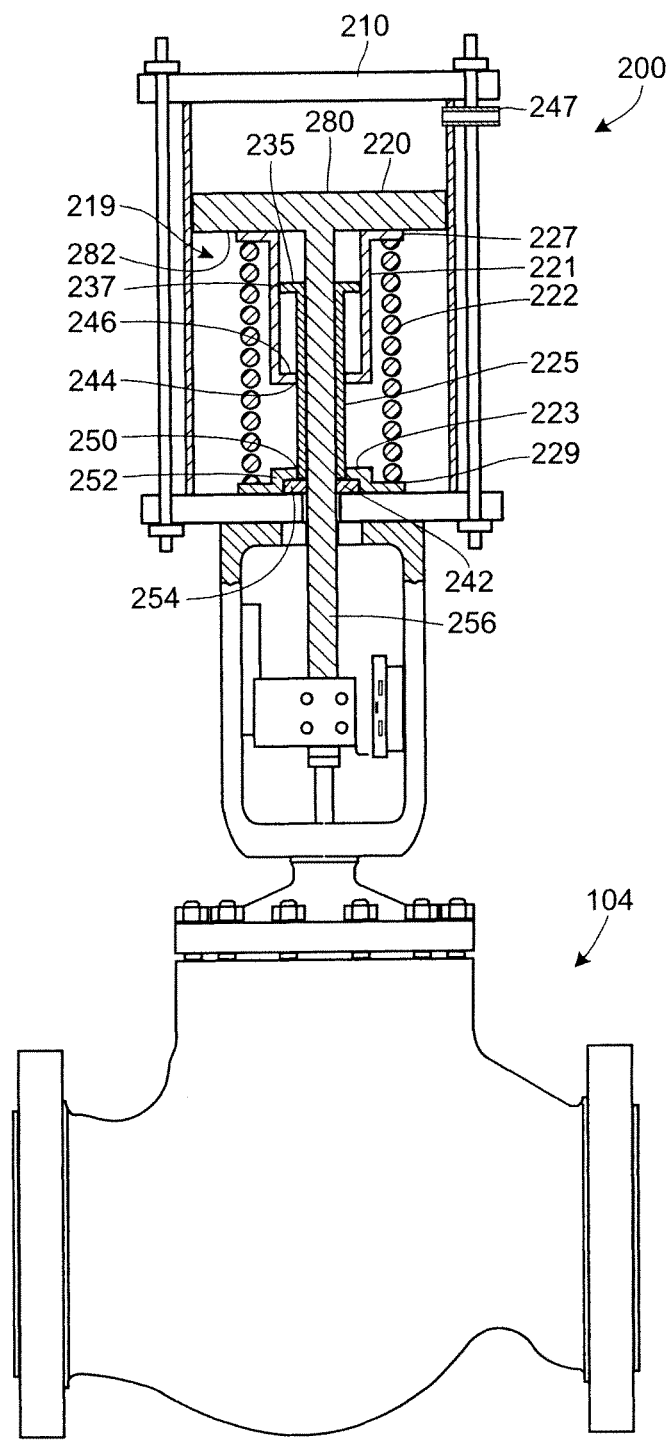
FIG. 3 depicts the valve, the actuator, and the biasing device of FIG. 2 with the biasing device in a partially compressed position.

FIG. 2 depicts an example actuator 200 (e.g., a piston actuator, a single-acting piston actuator, a double-acting piston actuator, etc.) coupled to a body 102 of a valve 104 via a yoke lock nut 290. The actuator 200 includes a cylinder 208 coupled between a first plate 210 and a second plate 212 via a plurality of tie rods 214 and fasteners 216. In contrast to the known actuator 100 described in FIG. 1 above, the cylinder 208 defines a chamber 218 in which a piston 220 and an example biasing device 219 are positioned. Control fluid may be transferred into and out of the chamber 218 via a port 247. The biasing device 219 may be manufactured and/or produced to be a self-contained unit or module that is disposed in the chamber 218 to provide a double-acting piston actuator with fail-safe biasing functionality, decrease the complexity and improve safety of assembling and/or disassembling the example actuator, and to reduce binding of the biasing element (e.g., spring). Additionally, the biasing device 219 may be utilized with a single-acting piston actuator to bias a piston operatively coupled to the fluid control element. The biasing device 219 may also provide the single-acting piston actuator with fail-safe biasing functionality as well as decrease the complexity and improve safety of assembling and/or disassembling the example actuator. As depicted in FIG. 2, the biasing device 219 is extended to position the fluid control element via the piston 220 in, for example, an open position and/or a fail-safe position (e.g., an open position or a closed position). In contrast, FIG. 3 depicts the biasing device 219 at least partially compressed and the piston 220 at a distance from the first plate 210 to enable, for example, modulation of the fluid flow through the valve 104.

The example biasing device 219 includes a tubular seat member 221, a tubular seat bracket 223, a tubular retention member 225, and a biasing element 222 (e.g., a spring) positioned between external annular flanges 227 and 229 of the respective tubular seat member 221 and tubular seat bracket 223. The biasing element 222 urges the tubular seat member 221 away from the tubular seat bracket 223 to position, for example, a fluid control member (not shown) of the valve 104 in the open position. In other embodiments, the biasing element 222 may urge the tubular seat member 221 away from the tubular seat bracket to position a fluid control member in the closed position. The tubular seat member 221 may have an inner diameter 231 that is larger than an outer diameter 233 of the tubular retention member 225 such that the tubular retention member 225 is at least partially disposed within the tubular seat member 221. While the external flange 227 of the tubular seat member 221 is positioned adjacent the piston 220 in the example depicted in FIG. 2, alternatively, the orientation of the biasing device 219 may be reversed such that the external flange 229 of the tubular seat bracket 223 may be positioned adjacent the piston 220.

To limit movement of the tubular seat member 221 relative to the tubular seat bracket 223 and/or movably couple the tubular seat member 221 and tubular seat bracket 223 together, the tubular retention member 225 is provided between the tubular seat member 221 and tubular seat bracket 223. In this example, the tubular retention member 225 includes a plate 235 at a first end of the tubular retention member 225, the plate 235 extending laterally beyond a perimeter of the tubular retention member 225 forming an external flange 237. The external flange 237 extends toward and/or is positioned adjacent to an interior surface 239 of the tubular seat bracket 223. The tubular retention member 225 may include inner and/or outer threads 245 (see e.g., FIG. 4) opposite the external flange 237. The outer threads 245 may receive a retention nut 242, which secures the tubular retention member 225 within an opening 244 in an internal flange 246 formed in an end of the tubular seat member 221 opposite the external annular flange 227. The inner threads 245 may retain an extension member 225b, which is discussed further hereinafter, to aid in assembly of the biasing device 219. The retention nut 242 also secures the tubular retention member within an opening 248 (see e.g., FIG. 4) in an internal flange 250 formed in an end of the tubular seat bracket 223 opposite the external annular flange 229. A body 252 of the tubular seat bracket 223 and the internal flange 250 of the tubular seat bracket 223 form a recessed area 254 that receives the retention nut 242.

To assemble the actuator 200, the biasing device 219 is positioned in the chamber 218 such that the external annular flange 229 of the tubular seat bracket 223 is adjacent the second plate 212. An actuator stem 256 coupled to the piston 220 is guided through the tubular retention member 225, opening 248 in the tubular seat bracket 223, and apertures 258 and 260 defined by the second plate 212 and a yoke 262, respectively. In contrast to the actuator 100 described above in which the spring 122 (FIG. 1) is fully decompressed when the spring 122 (FIG. 1) is initially positioned in the chamber 118 (FIG. 1), the biasing element 222 of the biasing device 219 is compressed (e.g., preloaded) and contained between the external annular flange 227 of the tubular seat member 221 and the external annular flange 229 of the tubular seat bracket 223. In other words, the biasing device 219 may be pre-assembled as a biasing assembly prior to positioning the biasing device 219 in the actuator. Moreover, the biasing member 222 is secured between the tubular seat member 221 and the tubular seat bracket 223 so that there is no danger of the biasing member 222 releasing stored energy during assembly/disassembly of the actuator 200. As such, once the biasing device 219, the actuator stem 256, and the piston 220 are positioned within the chamber 218, the first plate 210 may be coupled to the actuator 200 without any additional measures and/or precautions being taken. To disassemble the actuator 200, the fasteners 214 may be loosened and the first plate 210 may be removed without having to first decompress the biasing element 222.

The tubular seat member 221, the tubular seat bracket 223, and the tubular retention member 225 may have virtually any cross-sectional shape, such as, for example, circular, square, rectangular, oval, polygonal, etc. Additionally, the annular flanges on may be partial or full flanges. In other words, the flanges described herein need not extend completely around a perimeter of an element, but rather, the flanges may only partially extend around a perimeter of the element.

Figure 4:
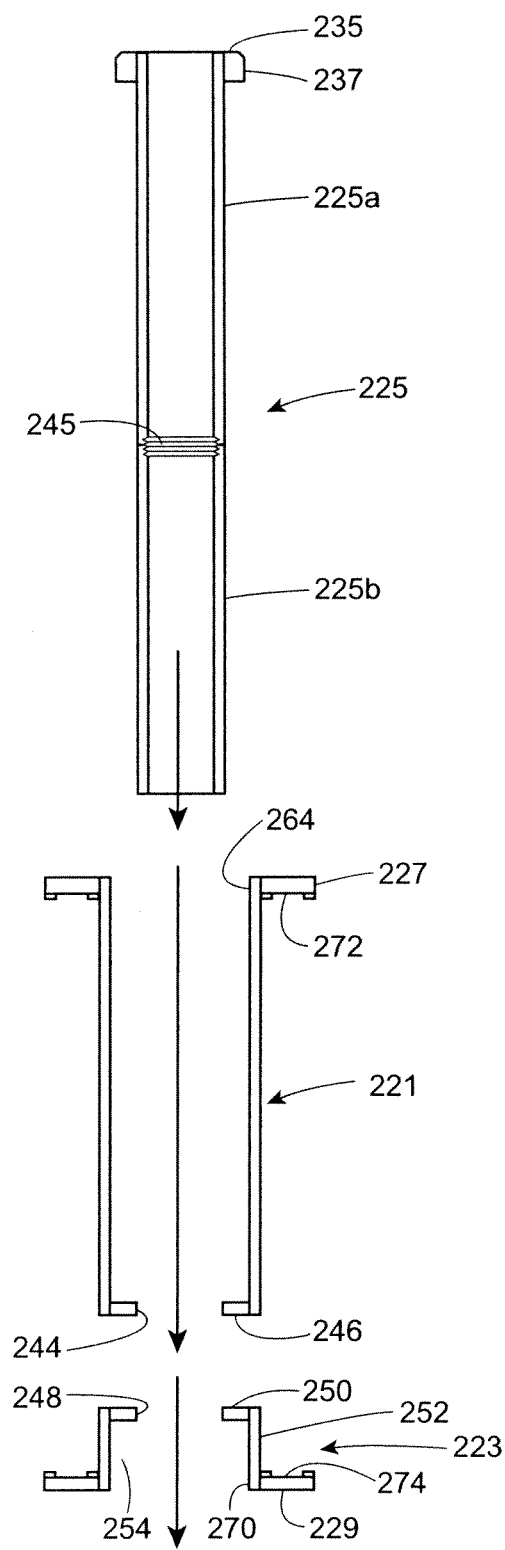
FIG. 4 depicts an exploded cross-sectional view of the biasing device of FIG. 2.
Figure 5:
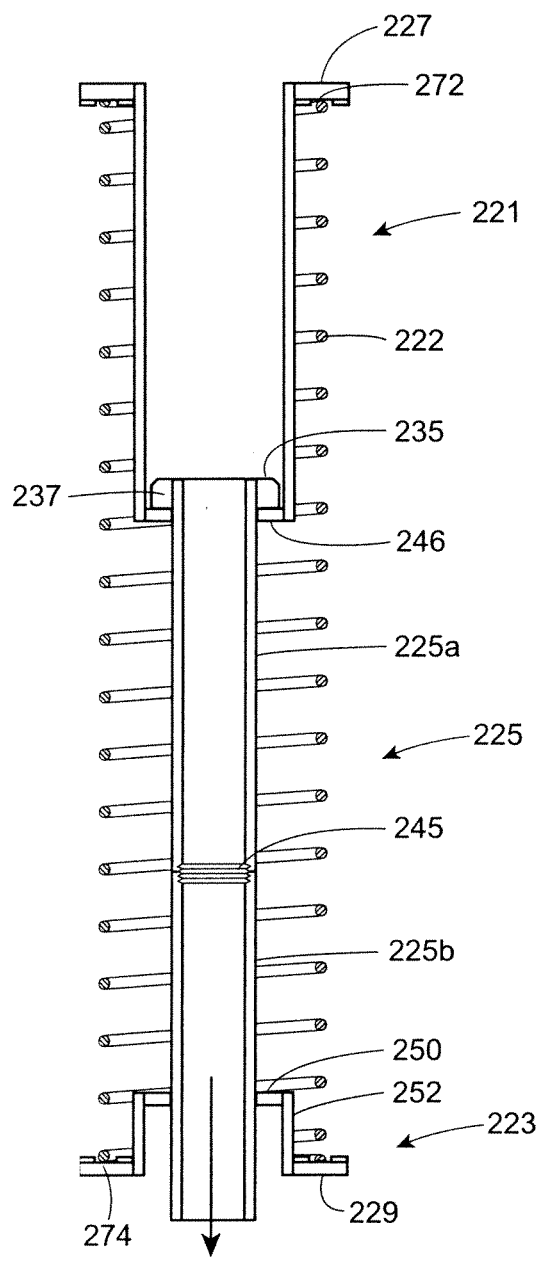
FIG. 5 depicts across-sectional view of an initial assembly position of the biasing device of FIG. 2.
Figure 6:
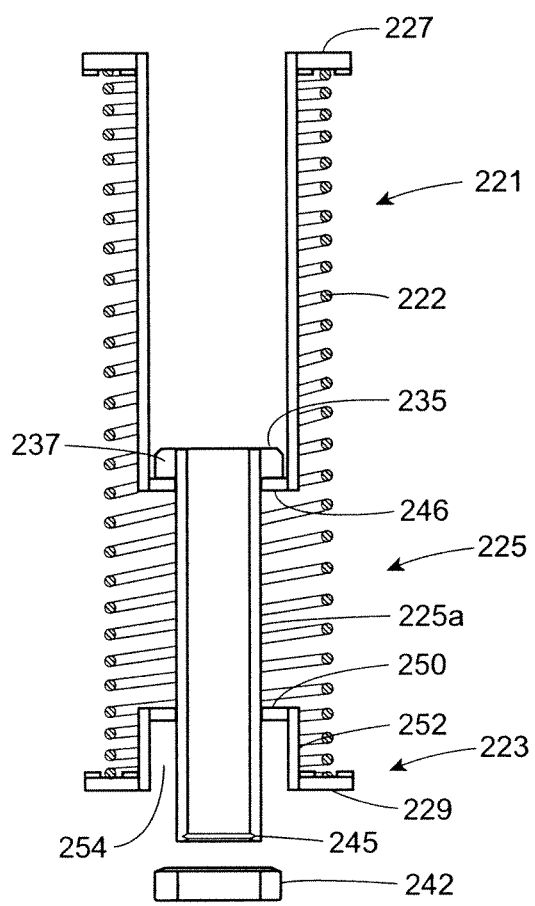
FIG. 6 depicts across-sectional view of an intermediate assembly position of the biasing device of FIG. 2 including a lock nut.
Figure 7:
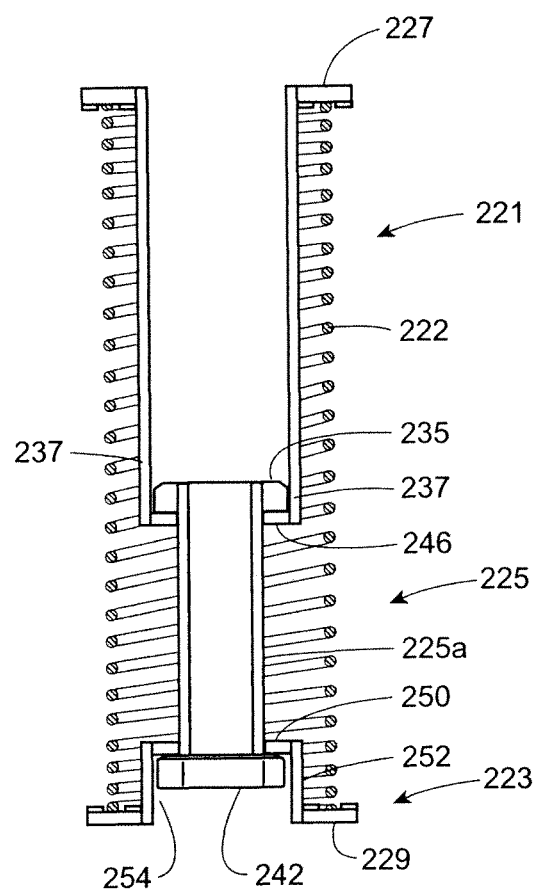
FIG. 7 depicts a cross-sectional view of a fully assembled position of the biasing device of FIG. 2.

Referring now to FIGS. 4-8, to assemble the biasing device 219, the tubular retention member 225, the tubular seat member 221, and the tubular seat bracket 223 are longitudinally aligned, as illustrated in FIG. 4. The tubular retention member 225 is inserted through a first opening 264 in the tubular seat member 221 proximate the external annular flange 227, and through the opening 244 in the tubular seat member 221 proximate the internal flange 246 until the external flange 237 of the tubular retention member 225 is stopped by the internal flange 246 of the tubular seat member 221 (See FIG. 5). The tubular seat member 221 and the tubular retention member 225 are then placed within the biasing member 222 such that one end of the biasing member 222 rests in a seating surface 272, which may be a recessed area on one side of the external annular flange 227. Thereafter, the tubular seat bracket 223 is placed over the tubular retention member 225 such that the tubular retention member 225 extends through the opening 248 in the tubular seat bracket 223 proximate the internal flange 250 and through another opening 270 in the tubular seat bracket 223 proximate the external annular flange 229. A second end of the biasing member 222 is disposed in a seating surface 274, similar to the seating surface 272, on one side of the external annular flange 229. Optionally, prior to assembly, a tubular retention extension 225b (FIG. 4) may be attached to a first section 225a of the tubular retention member 225 to facilitate assembly of the tubular retention member 225 (i.e., to lengthen the tubular retention member 225), the tubular seat member 221, and the tubular seat bracket 223. The tubular retention extension 225b may be attached to the first section 225a by virtually any attachment method, such as, for example, threads, welding, adhesive, crimping, etc.

Once the tubular seat member 221, the tubular seat bracket 223, the tubular retention member 225, and the biasing member 222 are assembled, the retention nut 242 is threaded on one end of the tubular retention member 225 (See FIGS. 6 and 7), the retention nut 242 rests in the recessed area 254 of the tubular seat bracket 223. If the tubular retention member 225 was optionally fitted with the extension 225b, the extension 225b may be removed either before or after the retention nut is secured to the tubular retention member 225.

Figure 8:
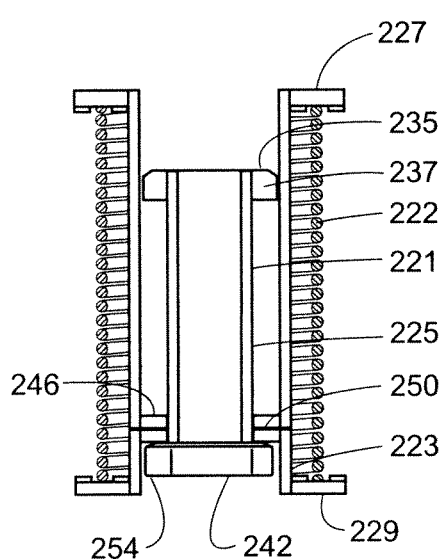
FIG. 8 depicts across-sectional view of a fully compressed position of the biasing device of FIG. 2.

FIG. 8 illustrates the biasing device 219 in its fully compressed state in which the internal flange 246 of the tubular seat member 221 is located adjacent the internal flange 250 of the tubular seat bracket 223.

Figure 9:
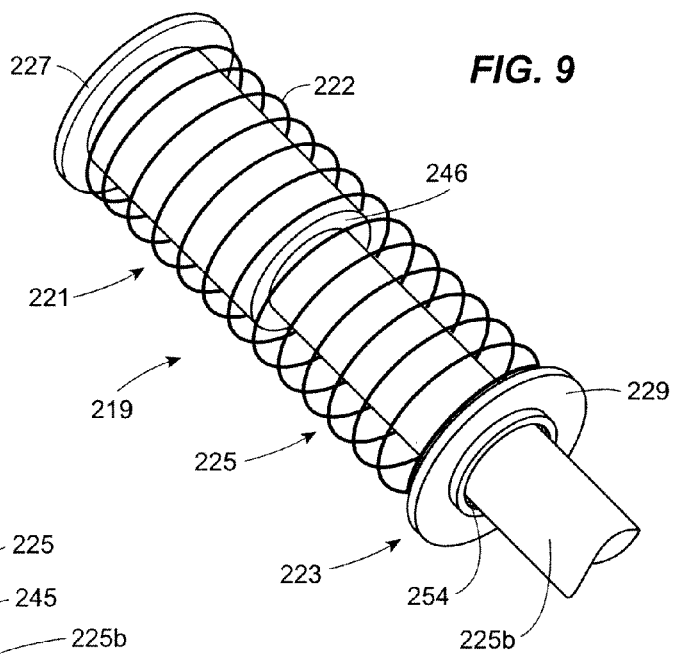
FIG. 9 is a perspective view of the biasing device of FIG. 2.
Figure 10:
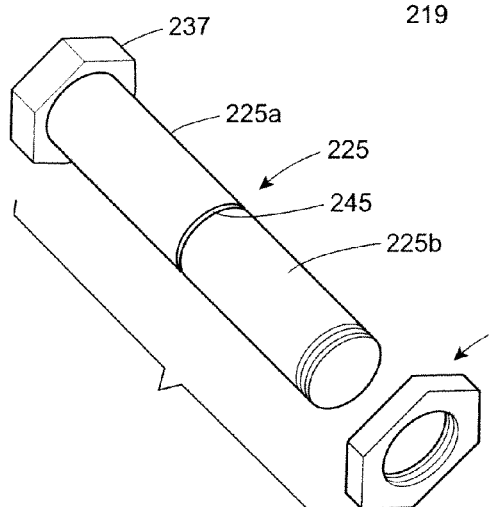
FIG. 10 is a perspective view of the tubular retention member and lock nut of the biasing device of FIG. 2.
Figure 11:
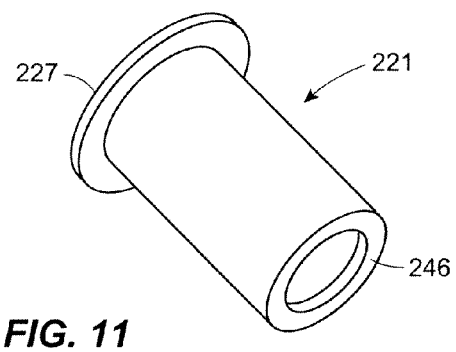
FIG. 11 is a perspective view of the tubular seat member of the biasing device of FIG. 2.

FIGS. 9-11 illustrate perspective views of the biasing device 219 in an assembled condition (FIG. 9), the tubular retention member 225 and retention nut 242 (FIG. 10), and the tubular seat member 221 (FIG. 11). As illustrated in FIG. 9, the biasing device 219 may be pre-assembled prior to installation in an actuator. The disclosed biasing device 219 advantageously reduces binding of the biasing element 222 because the biasing element 222 is not externally constrained. In other words, the biasing device 219 does not include an external canister wall that the biasing element 222 could bind against. Additionally, the biasing element 222 is fully contained by the external flanges 227, 229 and could not slip off of the biasing device 219.

In operation, to move the fluid control element within the valve 104, a pressure difference is provided across a first chamber portion 276 and a second chamber portion 278 (FIG. 2). Specifically, to move the fluid control element towards the orifice, fluid is pumped through a port 247 such that a force exerted on a first surface 280 of the piston 220 overcomes a force exerted against a second surface 282 via the biasing element 222 of the biasing device 219. Alternatively, to move the fluid control element away from the orifice, fluid is exhausted through the port 247 until, for example, the force exerted on the second surface 282 via the biasing device 219 overcomes the force exerted on the first surface 280 via the pressure in the first chamber portion 276.

Figures 12, 13:
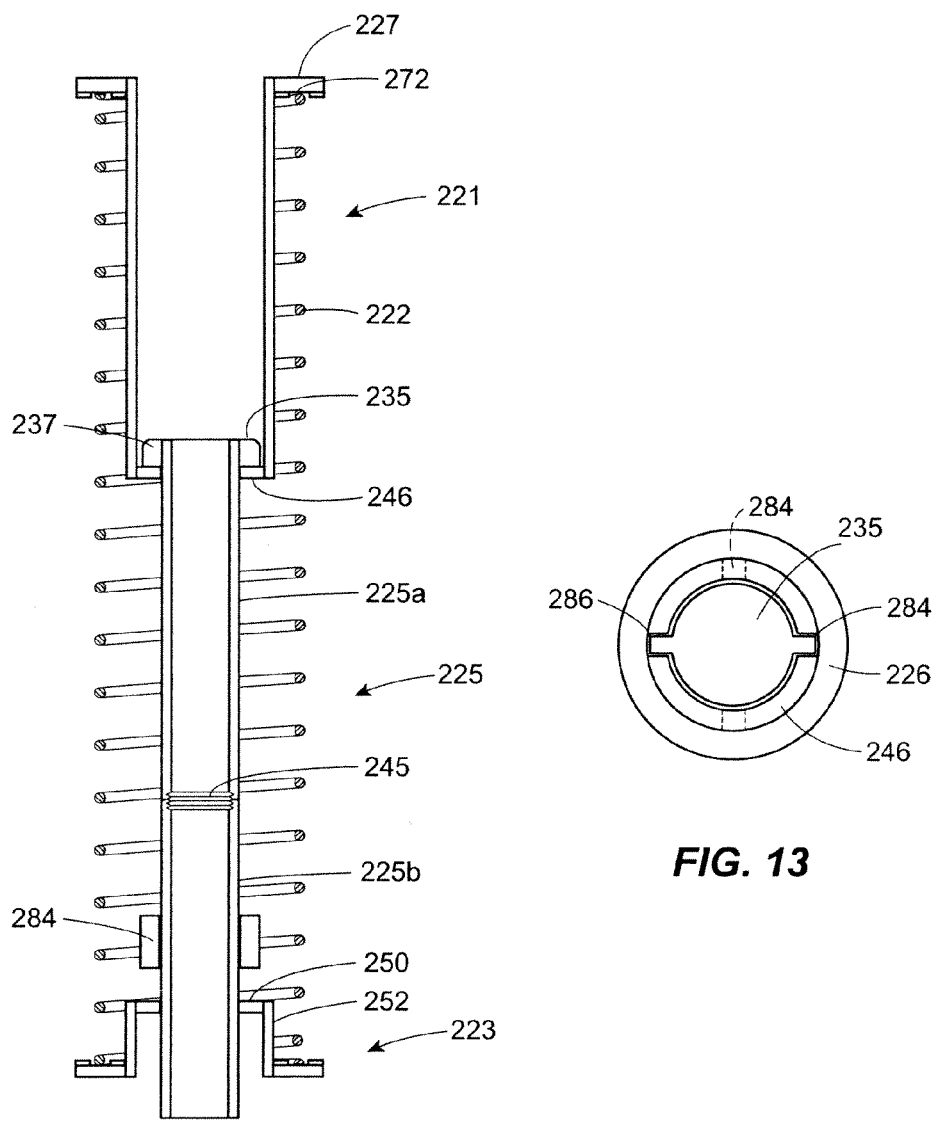
FIG. 12 is a cross-sectional view of an alternative embodiment of a biasing device constructed in accordance with the teachings of the disclosure, including a stop member disposed on the tubular retention member.
FIG. 13 is a top view of the biasing device of FIG. 12, illustrating the stop member and a slot formed in the inner annular flange of the tubular seat member.

FIGS. 12 and 13 illustrate another embodiment of the biasing device 219 including stops 284 (e.g., travel stops) coupled to the exterior surface of the tubular retention member 225. The stops 284 may be engaged by the interior flange 246 of the tubular seat member 221 to limit the amount of movement of the tubular seat member 221 toward the tubular seat bracket 223. In operation, as the force exerted on the first surface 280 of the piston 220 (FIG. 2) overcomes the force exerted on the second surface 282 via the biasing element 222, the biasing device 219 may compress and the internal flange 246 may engage the stops 284 to limit the amount of movement of the tubular seat member 221 toward the tubular seat bracket 223. Such an approach of providing the biasing device 219 with the stops 284 enables the travel of the fluid control element to be tailored to the particular application regardless of the allowable cylinder stroke length.

In order to assemble the biasing device 219 of FIG. 12, the internal flange 246 of the tubular seat member 221 includes one or more slots 286 (FIG. 13), which accommodate the stops 284. When the tubular retention member 225 is inserted into the tubular seat member 221, the stops 284 are aligned with the slots 286 so that the stops 284 pass through the slots 286. Once the stops 284 pass through the slots 286, the tubular retention member 225 may be rotated such that the stops 284 are no longer aligned with the slots 286 (shown in phantom in FIG. 13), thereby preventing the stops 284 from passing though the slots 286 during operation of the biasing device 219.

Figure 14:
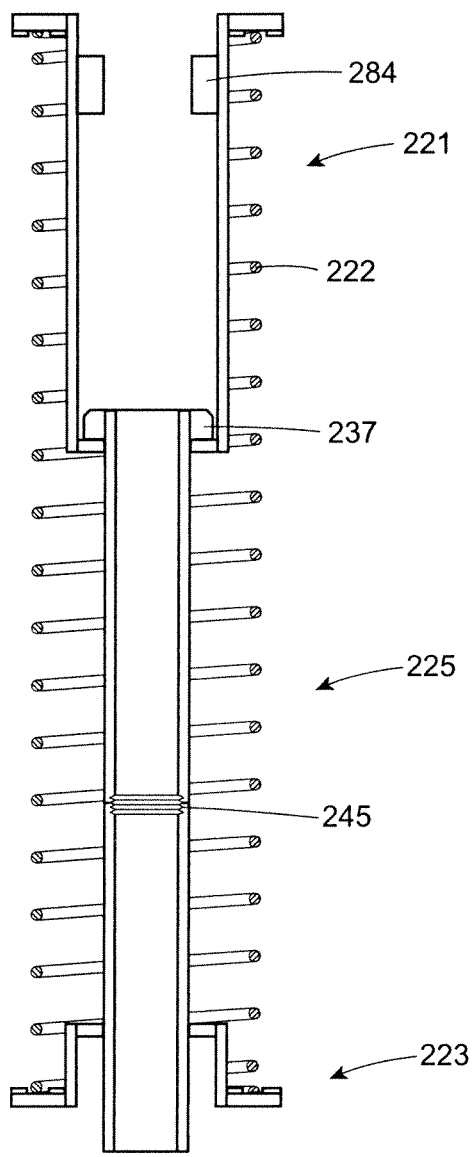
FIG. 14 is a cross-sectional view of another alternative embodiment of a biasing device constructed in accordance with the teachings of the disclosure, including a stop member disposed on an inner surface of the tubular seat member.

Yet another embodiment of the disclosed biasing device 219 is illustrated in FIG. 14. In this embodiment, the biasing device 219 may include stops 284 that are positioned on an interior surface of the tubular seat member 221. Slots (not shown) in the external flange 237 of the tubular retention member 225 facilitate assembly similar to the slots 286 of the embodiment of FIGS. 12 and 13. In operation, the stops 284 limit movement of the tubular seat member 221 relative to the tubular seat bracket 223 when the stops 284 engage the plate 235 on the tubular retention member 225.

The biasing devices assembled in accordance with the teachings of the examples described herein are related to biasing devices that improve safety and decrease the complexity and/or the time required to assemble and/or disassemble actuators. For example, the biasing devices assembled in accordance with the teachings of the disclosure, as described herein, enable actuators to be assembled and/or disassembled without first having to compress and/or decompress a spring positioned in the actuator. Additionally, the biasing devices disclosed herein reduce the possibility of binding of the spring or biasing element and improved axial performance of the spring or biasing element. Moreover, the disclosed biasing devices improve safety during assembly of actuators because the spring or biasing element is pre-compressed and retained in the biasing device.

Although certain example methods, device and articles of manufacture have been described herein, the scope of coverage of this patent is not limited thereto. On the contrary, this patent covers all methods, device and articles of manufacture fairly falling within the scope of the appended claims either literally or under the doctrine of equivalents.

What is claimed is:

1. A biasing device for use with a piston actuator of a fluid valve, the biasing device comprising:
    a tubular seat member having an exterior annular flange at a first end of a hollow tube and an interior flange at a second end of the hollow tube;
    a tubular retention member having a plate at a first end, the plate extending laterally beyond external edges of the tubular retention member and forming an external flange about a perimeter of the first end of the tubular retention member;
    a tubular seat bracket having a hollow center portion, an external annular flange at a first end of the hollow center portion, and an internal flange at a second end of the hollow center portion;
    a tubular retention extension that is removably attached to the tubular retention member, the tubular retention extension lengthening the tubular retention member, and
    a biasing element disposed between the external annular flange of the tubular seat member and the external annular flange of the tubular seat bracket;
    wherein the tubular retention member is partially disposed within the tubular seat member, the tubular retention member passing through an opening in the inner flange of the tubular seat member, the plate being larger than the opening in the inner flange of the tubular seat member, the tubular retention member being partially disposed within the tubular seat bracket, the tubular retention member passing through an opening in the inner flange of the tubular seat bracket, and the biasing member being seated against the exterior annular flange of the tubular seat member and against the exterior annular flange of the tubular seat bracket.

2. The biasing device as defined in claim 1, wherein the tubular retention extension is removably attached to the tubular retention member with a threaded connection.

3. A biasing device for use with a piston actuator of a fluid valve, the biasing device comprising:
    a tubular seat member having an exterior annular flange at a first end of a hollow tube and an interior flange at a second end of the hollow tube;
    a tubular retention member having a plate at a first end, the plate extending laterally beyond external edges of the tubular retention member and forming an external flange about a perimeter of the first end of the tubular retention member;
    a tubular seat bracket having a hollow center portion, an external annular flange at a first end of the hollow center portion, and an internal flange at a second end of the hollow center portion;
    a stop disposed on an outer surface of the tubular retention member; and
    a biasing element disposed between the external annular flange of the tubular seat member and the external annular flange of the tubular seat bracket;
    wherein the tubular retention member is partially disposed within the tubular seat member, the tubular retention member passing through an opening in the inner flange of the tubular seat member, the plate being larger than the opening in the inner flange of the tubular seat member, the tubular retention member being partially disposed within the tubular seat bracket, the tubular retention member passing through an opening in the inner flange of the tubular seat bracket, the biasing member being seated against the exterior annular flange of the tubular seat member and against the exterior annular flange of the tubular seat bracket,
    wherein the stop fits in a slot formed in the inner flange of the tubular seat member, and
    wherein the tubular retention member is rotatable within the tubular seat member and during assembly the stop is aligned with the slot when the tubular retention member is inserted into the tubular seat member and after the stop passes through the slot, the tubular retention member is rotated so that the stop and slot are not aligned.

4. The biasing device as defined in claim 3, wherein the biasing element is a spring.

5. The biasing device as defined in claim 4, wherein the external annular flanges of the tubular seat member and the tubular seat bracket each include a recess for receiving an end of the spring.

6. The biasing device as defined in claim 3, wherein the tubular retention member is secured with a retention nut threaded on a second end of the tubular retention member, the retention nut seating in a recess formed by the second end of the hollow center portion of the tubular seat bracket.

7. The biasing device as defined in claim 6, wherein the retention nut is welded to the tubular retention member after the retention nut is threaded on the tubular retention member.

8. The biasing device as defined in claim 3, wherein the biasing element biases a valve stem and valve plug to an open position.

9. The biasing device as defined in claim 3, wherein the biasing element biases a valve stem and valve plug to a closed position.

10. A biasing device for use with a piston actuator of a fluid valve, the biasing device comprising:
    a tubular seat member having an exterior annular flange at a first end of a hollow tube and an interior flange at a second end of the hollow tube;
    a tubular retention member having a plate at a first end, the plate extending laterally beyond external edges of the tubular retention member and forming an external flange about a perimeter of the first end of the tubular retention member;
    a tubular seat bracket having a hollow center portion, an external annular flange at a first end of the hollow center portion, and an internal flange at a second end of the hollow center portion;

a stop disposed on an inner surface of the tubular seat member, and a biasing element disposed between the external annular flange of the tubular seat member and the external annular flange of the tubular seat bracket;

wherein the tubular retention member is partially disposed within the tubular seat member, the tubular retention member passing through an opening in the inner flange of the tubular seat member, the plate being larger than the opening in the inner flange of the tubular seat member, the tubular retention member being partially disposed within the tubular seat bracket, the tubular retention member passing through an opening in the inner flange of the tubular seat bracket, and the biasing member being seated against the exterior annular flange of the tubular seat member and against the exterior annular flange of the tubular seat bracket.

11. The biasing member of claim 10, wherein the stop fits in a slot formed in the external flange of the tubular retention member.

12. The biasing member of claim 10, wherein the tubular retention member is rotatable within the tubular seat member and during assembly the slot is aligned with the stop when the tubular retention member is inserted into the tubular seat member, and stop and slot are not aligned.

* * * * *

UNITED STATES PATENT AND TRADEMARK OFFICE
CERTIFICATE OF CORRECTION

PATENT NO. : 8,579,249 B2  
APPLICATION NO. : 12/939545  
DATED : November 12, 2013  
INVENTOR(S) : McCarty Page 1 of 1

It is certified that error appears in the above-identified patent and that said Letters Patent is hereby corrected as shown below:

In the Specification:

At Column 2, line 66, "across-sectional" should be -- a cross-sectional --.

At Column 3, line 1, "across-sectional" should be -- a cross-sectional --.

At Column 3, line 6, "across-sectional" should be -- a cross-sectional --.

Signed and Sealed this  
Twentieth Day of October, 2015

Michelle K. Lee  
*Director of the United States Patent and Trademark Office*